Figure 1:
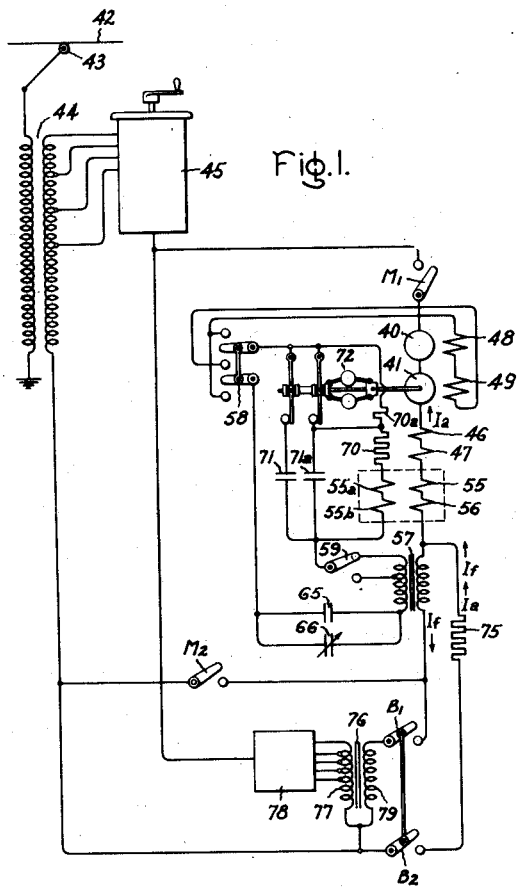

Feb. 24, 1942.  H. S. OGDEN  2,274,378
CONTROL SYSTEM
Filed April 16, 1941

Inventor:
Harold S. Ogden,
by Harry E. Dunham
His Attorney.

Patented Feb. 24, 1942

2,274,378

UNITED STATES PATENT OFFICE 2,274,378

CONTROL SYSTEM

Harold S. Ogden, Erie, Pa., assignor to General Electric Company, a corporation of New York Application April 16, 1941, Serial No. 388,874

17 Claims. (Cl. 171—228)

My invention relates to control systems and particularly to systems for controlling the operation of single phase alternating current motors of the commutating type.

In commutating machinery it is customary to use brushes which are slightly wider than a single commutator bar, whereby during commutation two armature coils are short circuited while the brush rests on three adjacent commutator bars and one armature coil is short circuited whenever the brush rests upon two adjacent commutator bars. In either a direct current or an alternating current series connected commutating machine the current flowing in the armature winding sets up a flux displaced by substantially ninety degrees from the main field flux. The armature flux is called armature reaction and is in a position to generate a voltage by rotation in the short circuited turns being commutated. In an alternating current machine an additional voltage is generated in the short circuited turns by transformer action from the main field by virtue of the fact that the short circuited turns are positioned to enclose a part of the main field flux. In order to prevent sparking at the brushes during commutation it is necessary to compensate for or otherwise overcome the effects of the various voltages induced in the short circuited armature turns. For this purpose interpole fields located adjacent the short circuited armature turns have been used. The interpole winding itself is ordinarily highly inductive and is shunted during motoring operation by a non-inductive resistor, whereby the current in the interpole field lags behind the line current by an electrical angle substantially less than ninety degrees. Thus the lagging interpole field current may be said to consist of a component in phase with the line current and a component which lags the line current by ninety degrees. The in-phase component of interpole field current sets up a flux opposing the armature reaction and provides a slight additional flux to assist in reversing the current in the coil being commutated. The component of interpole field current which lags the line current by ninety degrees is referred to as the quadrature component, and sets up a flux which likewise lags the line current and thus the main field flux by substantially ninety degrees. Since the voltage induced in the short circuited turns by the main field, called the transformed voltage also lags the main field flux by substantially ninety degrees, the interpole field may be wound in such a direction that the quadrature flux, when cut by the rotation of the short circuited armature turns, will induce in the short circuited turn a voltage opposing the transformed voltage.

From the above observations it will be evident that since the transformed voltage always lags the main field flux by substantially ninety degrees, the quadrature component of interpole field current must likewise lag the main field flux by the same amount. When an alternating current series motor is operated as a generator, as during regenerative braking of an electric vehicle, the generated voltage and the main field flux remain in the same direction as during motoring operation but the line current reverses. Since the quadrature component of interpole field current must still lag the main field flux, it will be evident that it must now lead the line current by ninety electrical degrees. Thus for regenerating operation of a single phase alternating current series motor it has heretofore been necessary to switch the connections of the interpole field shunt to place a non-inductive resistance in series with the interpole field winding and to shunt this series circuit through a highly inductive field shunt.

Accordingly it is an object of my invention to provide new and improved means for controlling a single phase alternating current series motor for both motoring and regenerative braking operation.

It is a further object of my invention to provide novel and simplified means for controlling the in-phase and quadrature compensation in a single phase alternating current series motor.

Another object of my invention is to provide means for supplying proper in-phase and quadrature components of interpole field current during both motoring and regenerative braking operation of a single phase alternating current series motor while maintaining the interpole field connections unchanged.

Still a further object of my invention is to provide a single means operative during both motoring and generating operations to vary the amount of quadrature compensation in accordance with the speed of the motor.

It is a specific object of my invention to provide a complete system in which the power factor of a single phase alternating current series motor is appreciably improved during both regenerative braking and motoring operation and in which no switching of the interpole field connections is necessary upon a change from motoring to generating operation.

According to my invention the above and other objects are attained by splitting the interpole field winding of the motor into two parts, one of which supplies only the in-phase interpole compensation and the other of which supplies only the quadrature compensation. With this arrangement that portion of the interpole field winding which supplies only the in-phase compensation may be kept at all times electrically in circuit with the armature winding, and that portion of the interpole field winding which supplies only the quadrature compensation may be kept at all times electrically in circuit with the main field winding, thereby avoiding any switching of the interpole field connections upon a change from motoring to regenerative braking operation. Likewise, the same means which is effective to change the magnitude of the quadrature compensation in accordance with motor speed during motoring becomes equally effective to control the amount of quadrature compensation in accordance with the speed of the machine during generating operation.

Figure 2:
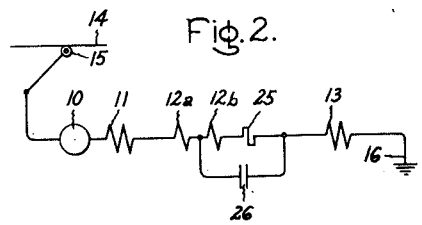
Figure 5:
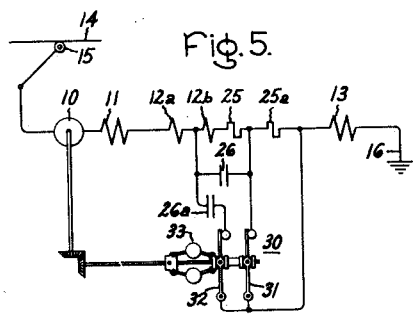
Figure 3:
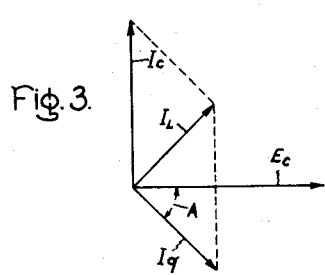
Figure 6:
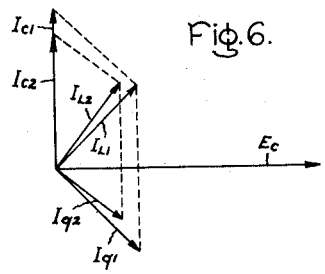
Figure 4:
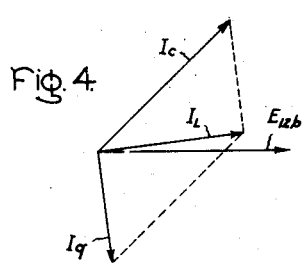

The features of my invention which I consider new and novel will be pointed out with particularity in the appended claims. Further objects of the invention will be apparent and the invention itself will be better understood, however, from a consideration of the following detailed description taken in conjunction with the accompanying drawing in which Fig. 1 is a schematic circuit diagram of connections for a control system embodying my invention; Fig. 2 is a simplified circuit diagram of connections for a single phase alternating current series motor embodying my invention; Figs. 3 and 4 are vector diagrams illustrating certain conditions of operation of a motor connected as shown in Fig. 2; Fig. 5 is a simplified circuit diagram of connections for a single phase alternating current series motor embodying my invention in a modified form; and Fig. 6 is a vector diagram illustrating the operation of the motor circuit shown in Fig. 5. Corresponding parts in the various figures have been assigned like reference numerals.

In Part II of an article entitled "The Single-Phase Commutator Type Traction Motor" written by Felix Konn and published in the General Electric Review, volume 35, No. 5, pages 275 to 279, it is pointed out that, when a single-phase alternating current series motor is connected for regenerative braking operation, the main field flux and the armature voltage remain in the same direction as during motoring operation but the armature current reverses. The article also clearly explains why it has heretofore been necessary to switch the interpole shunt connections upon a change between motoring and regenerative braking operation. In Part I of Mr. Konn's article, published in the General Electric Review, volume 35, No. 4, pages 213, 214, the vector relations of the line current, the interpole field current, and the interpole shunt current are discussed. From this discussion it will be evident that, while the in-phase and quadrature components of the interpole field current are the currents which actually perform the desired compensating functions, such currents are analytical concepts only and do not actually exist in any part of the circuit of the conventional single-phase series motor. In such a motor the vector sum of the in-phase and quadrature currents is the current which actually flows through the interpole winding. Thus, when under regenerating conditions it is desired to make the quadrature component of interpole current lead the in-phase component, it has been necessary to provide means for causing the entire interpole current to lead the line current. Such a change in the relative phase position of the entire interpole field current necessitates a number of complicated switching operations, as has been explained in Mr. Konn's article.

At Fig. 2 there is illustrated a circuit arrangement for the interpole field winding of an alternating current series motor by means of which the quadrature component and the in-phase component of interpole field current are physically separated so that the quadrature component alone flows in one portion of the interpole field winding and the in-phase component alone flows in another portion of the interpole field winding. According to Fig. 2 the motor 10 is provided with a compensating winding 11, a divided interpole field winding comprising portions 12a and 12b in series with a resistor 25, and a main field winding 13. As indicated, the motor 10 is energized from a single-phase source of alternating current supply 14 through a trolley 15 and is connected to ground by a ground connection 16. Since the portion 12a of the interpole field winding is permanently in circuit with the armature of the motor 10, this portion of the interpole winding carries the armature current and thus always provides a properly directly in-phase component of interpole current. In order to provide a quadrature component of interpole current a capacitor 26 is shunted across the resistor 25 and the portion 12b of the interpole winding. Since the capacitor 26 draws a current which leads the voltage across the capacitor by substantially ninety degrees the current through the portion 12b of the interpole winding will lag the voltage across the capacitor and may be adjusted to be exactly ninety degrees out of phase with the line current. Thus the portion 12b of the interpole winding carries the quadrature component of interpole current only and may be kept permanently in the same circuit with the main field winding 13. It will be understood of course that, in accordance with my invention, any desired number or arrangement of capacitors may be provided in the shunt circuit around the winding 12b.

To illustrate the operation of the system shown in Fig. 2 I have drawn at Fig. 3 a vector diagram upon which the vector $E_c$ represents the voltage across the capacitor 26. The current flowing through the capacitor may be represented by a vector $I_c$ leading the vector $E_c$ by substantially ninety degrees. Since the shunt circuit around the capacitor 26 consists of an inductive portion 12b of the interpole field winding in series with the resistor 25, the current $I_q$ passing through the portion 12b of the interpole winding will lag the voltage $E_c$ by an angle A which depends upon the relative values of inductance and capacitance in the circuit through the interpole winding 12b. By way of example only I have illustrated the angle A as equal to approximately forty-five degrees. Since the vector sum of the currents $I_q$ and $I_c$ must equal the line current $I_L$, it will be evident that the magnitude of the current $I_c$ may be so adjusted that the current $I_L$ will lead the current $I_q$ by precisely ninety degrees. Thus the current passing through the portion 12a of the interpole field winding is the line current $I_L$, and the winding 12a may be provided with a sufficient number of turns to supply the necessary in-phase compensation. Likewise the portion 12b of the interpole field winding carries only the current $I_q$ which lags the line current by ninety degrees and thus provides the necessary quadrature compensation.

I wish to have it understood that if desired the resistor 25 may be connected in series with the capacitor 26 of Fig. 2 across the portion 12b of the interpole field winding. Under these conditions, as shown at Fig. 4, the quadrature component of current $I_q$ flowing through the portion 12b of the interpole winding would lag the voltage $E_{12b}$ across the winding 12b by substantially ninety degrees, while the condenser current $I_c$ would lead the voltage $E_{12b}$ by something less than ninety degrees and might for example be adjusted to lead the voltage $E_{12b}$ by forty-five degrees. By proper proportioning of the magnitude of the condenser current $I_c$ the line current $I_L$, which is equal to the vector sum of $I_q$ and $I_c$, could be adjusted to be nearly in phase with the voltage $E_c$ and lead the quadrature current $I_q$ by precisely ninety degrees.

Since the transformed voltage in the armature coil undergoing commutation depends only upon the main field flux, the transformed voltage remains constant for any given value of load current. However, the compensating voltage being generated in the coil undergoing commutation to overcome the transformed voltage is generated by rotation of the armature, and thus depends upon both the magnitude of the quadrature component of interpole field flux and upon the speed of rotation of the armature. It will therefore be apparent that, once the quadrature compensation has been adjusted for any predetermined speed of motor operation, a condition of undercompensation will result if the motor speed decreases and a condition of overcompensation will result if the motor speed increases. It is well known that a certain amount of over- or undercompensation by the quadrature flux is permissible, since a certain small voltage may be present in the coil being commutated without causing sparking at the brushes. It is, however, desirable to change the amount of quadrature compensation at certain predetermined points within the speed range of the machine to keep the voltage in the coil being commutated within predetermined limits.

Fig. 5 illustrates a simple speed responsive arrangement whereby the amount of quadrature compensation may be controlled in accordance with the motor speed according to my invention. The elements in Fig. 5 which correspond to those in Fig. 2 have been assigned like reference numerals. In Fig. 5 the resistance 25 has been separated into two parts 25 and 25a while the capacitor 26 has been separated into two parts 26 and 26a. For the purpose of decreasing the magnitude of the quadrature current upon an increase of armature speed I have shown a centrifugally operated two pole switch 30 provided with contact arms 31 and 32. When the contact arms 31 and 32 are closed as at low motor speeds the resistor 25a is short circuited and the capacitors 26 and 26a are connected in parallel across the portion 12b of the interpole field and the resistor 25. When the contact arms 31 and 32 are opened, as by a centrifugal mechanism 33 operated in conjunction with the motor shaft, the resistance in series with the portion 12b of the field is increased by adding the resistor 25a while the shunting capacitance is decreased by open circuiting the capacitor 26a.

The effect of the switch 30 upon the interpole field currents is illustrated by the vector diagram of Fig. 6. In Fig. 6 the vector $E_c$ represents the voltage across the capacitor 26 and the vectors $I_{c1}$, $I_{q1}$ and $I_{L1}$ represent respectively the current through the capacitor 26, the interpole field winding 12b, and the interpole field winding 12a with the contact arms 31 and 32 closed. This portion of the diagram of Fig. 6 is similar to the diagram of Fig. 3. If now the contact arms 31 and 32 are open the magnitude of the condenser current is decreased as indicated at $I_{c2}$, the magnitude of the quadrature current and its angle of lag are both decreased as indicated at $I_{q2}$, and the vector sum $I_{L2}$ is equal to the former line current $I_{L1}$. It will be understood that the decrease in $I_{c2}$ results from the decrease in capacitance of the shunt circuit while the decrease in magnitude and phase angle of the current $I_{q2}$ results from the increased resistance of the series circuit through the winding 12b and the resistors 25 and 25a.

I wish to have it understood that, in accordance with the embodiment of my invention shown at Figs. 5 and 6, the quadrature current may be controlled in accordance with motor speed in any desired number of steps. To effect multiple step control it is only necessary to divide the resistor 25 into a corresponding number of sections, to provide a corresponding number of capacitors, and to arrange a suitable number of double pole speed responsive switches for sequential operation. It will now be evident that, due to the physical segregation of the in-phase and quadrature interpole currents according to my invention, the same speed responsive switch is suited for the control of the quadrature current during both motoring and braking operation.

To show how my invention as a whole may be applied to an electric vehicle tractor motor control system, I have shown in Fig. 1 a schematic circuit diagram of connections for a pair of single phase alternating current series motors 40 and 41. As shown, energy is supplied to the motors 40 and 41 from a single phase source of alternating current supply 42 through a trolley 43 and a power transformer 44. For motoring operation the motors 40 and 41 may be connected to the secondary winding of the power transformer 44 through a voltage controller 45 and a pair of motoring switches $M_1$ and $M_2$. The motors 40 and 41 themselves comprise respectively the compensating windings 46, 47, the main field windings 48, 49, the in-phase portion 55, 56 of the interpole field windings, and the quadrature portions 55a, 56a of the interpole field windings. As described and claimed in my copending application Serial No. 386,684, filed April 3, 1941, and assigned to the same assignee as the instant application, the main field windings 48 and 49 are energized in series with one or more main field condensers 65 and 66 through a field transformer 57, a reversing switch 58 and a tap changing switch 59. According to the present invention the quadrature portions 55a and 56a of the interpole field winding are at all times electrically in circuit with the main series field windings and, as shown at Fig. 1, are therefore also energized through the field transformer 57. As has already been described with reference to Fig. 5, the quadrature portions 55a and 56a of the interpole field winding are connected in series with a divided resistor 70, 70a and are shunted by a pair of capacitors 71 and 71a. A centrifugally operated switching mechanism 72 is arranged to control the resistor 70, 70a and the capacitors 71 and 71a. It will be understood that, while the in-phase and quadrature portions 55, 56 and 55a, 56a respectively of the interpole windings are insulated from each other by the field transformer 57, they are effectively energized in series circuit relation by virtue of the fact that the transformer 57 is a current transformer.

For regenerative braking operation I have provided a stabilizing resistor 75 and a field exciting transformer 76. The field exciting transformer 76 comprises a primary winding 77 energized from the secondary winding of the power transformer 44 through a voltage control device 78. During generating operation the secondary winding 79 of the field exciting transformer 76 impresses upon the main field windings 48 and 49 a voltage of supply frequency through a field exciting circuit including a pair of braking switches B₁ and B₂, the stabilizing resistor 75, and the primary winding of the field transformer 57. The armature circuit during regeneration passes through the motoring switch M₁, the armatures of the motors 40 and 41, the compensating field windings 46 and 47, the in-phase portions 55 and 56 of the interpole field windings, the stabilizing resistor 75 and the braking switch B₂. As during motoring operation the main field circuit is excited from the secondary winding of the field transformer 57.

The stabilizing resistor 75 has the effect of reducing the voltage applied to the series primary winding of the field transformer 57 by the field exciting transformer 76, and also tends to maintain constant the voltage generated by the armatures of the motors 40 and 41. At Fig. 1 I have indicated the directions of the currents $I_a$ and $I_f$ respectively which exist in the armature and field exciting circuits during regenerative braking. It will be observed that the field and armature currents flow in the same direction through the stabilizing resistor 75. Since the stabilizing resistor 75 is in both the field exciting and armature circuits, an increased voltage drop across this resistor resulting from an increased armature current will decrease the voltage applied to the field transformer 57 and thereby diminish the energization of the series fields 48 and 49. The resulting decrease in field flux has the effect of reducing the voltage generated by the motor armatures and thus decreasing the armature currents. Since the series field current established by the field exciting transformer is in the same direction as the armature currents during motoring operation, the field windings 48 and 49 need not be reversed for regenerative braking operation.

The main field condensers 65 and 66 are preferably so adjusted that the capacitive reactance of these condensers is substantially equal to the inductive reactance of the main series fields 48 and 49. By such adjustment the resultant voltage drop across the main field circuits connected to the secondary winding of the field transformer 57 is brought substantially in phase with the line current and the power factor of the motor during both motoring and regenerating operation is appreciably improved as has been more fully described in my copending application mentioned above. It is believed that the operation of the control system illustrated in Fig. 1 will now be completely understood in view of the detailed description which has been set forth hereinbefore.

I wish to have it understood that, while I have shown the switches M₁, M₂, B₁, B₂, 58 and 59 as manually operated, these switches may be remotely controlled from a single manually operated drum controller in a manner which is well known to those skilled in the art.

It is now desired to direct attention to the numerous advantages inherent in a control system arranged according to my invention as in Fig. 1. As described in my copending application the field transformer 57 serves completely to insulate the main field winding circuit from the armature circuit of the motor and to step down the field current to a value suitable for use with condensers of a practical size. The main field condensers 65 and 66 serve to improve the power factor of the motor during both motoring and regenerating operation. As described in the present application, the interpole field condensers 71 and 71a permit the interpole winding to be split into two parts, one of which carries only the in-phase component of interpole current and the other of which carries only the quadrature component of interpole current. Such division of the interpole field winding into two sections permits the in-phase section to be maintained permanently in circuit with the motor armature and the quadrature section to be maintained permanently in circuit with the main series field winding, thus entirely eliminating the use of transfer switches for changing the connections of the interpole field circuit upon a change from motoring to braking operation. Furthermore, the fact that the same interpole field shunt circuit is used during both motoring and braking operation permits the use of a single speed responsive switching mechanism for controlling the amount of quadrature compensation under both conditions of operation. Heretofore, it has been necessary to provide one speed responsive switch for controlling the resistive interpole shunt during motoring and another speed responsive switch for controlling the inductive interpole shunt during braking.

While I have shown certain preferred embodiments of my invention by way of example, many additional modifications will undoubtedly occur to those skilled in the art and I, therefore, wish to have it understood that I intend by the appended claims to cover all such modifications and variations as fall within the true spirit and scope of my invention.

What I claim as new and desire to secure by Letters Patent of the United States, is:

1. In a system of control for a single phase alternating current motor having an armature and a series field winding, a divided interpole field winding for said motor, means for connecting a first portion of said interpole winding in series circuit relation with said armature, means for connecting a second portion of said interpole winding in series circuit relation with said series field winding, switching means for energizing said motor from a source of alternating current supply thereby to furnish separate currents to said first and second portions of said interpole winding, and means for maintaining a quadrature relationship between said currents.

2. In a system of control for a single phase alternating current motor having an armature and a series field winding, a divided interpole winding for said motor, means for energizing said motor from a source of alternating current supply thereby to furnish a separate current to each portion of said interpole winding, and a capacitor connected in parallel circuit relation with one portion of said interpole winding, whereby said currents bear a quadrature relationship to each other.

3. In a system of control for a single phase alternating current motor having an armature and a series field winding, a divided interpole winding for said motor comprising two portions energized in series circuit relation, a resistor connected in series with at least one portion of said interpole winding, and a capacitor connected in parallel circuit relation with said one portion of said interpole winding and said resistor.

4. In a system of control for a single phase alternating current motor having an armature and a series field winding, a divided interpole winding for said motor comprising two portions energized in series circuit relation, and a shunt circuit for one portion of said divided interpole winding comprising a capacitor and a resistor connected in series circuit relation.

5. In a system of control for a single phase alternating current motor having an armature and a series field winding, a divided interpole winding for said motor, means for connecting a first portion of said interpole winding in series circuit relation with said armature, means for connecting a second portion of said interpole winding in series circuit relation with said series field winding, and a capacitor connected in parallel circuit relation with said second portion of said interpole winding.

6. In a system of control for a single phase alternating current traction motor having an armature and a series field winding, switching means for connecting said motor to a source of alternating current supply to establish a series circuit through said armature and said series field winding for motoring operation, second switching means for connecting said motor to said source to establish a regenerative braking circuit through said armature and simultaneously to establish a field exciting circuit for said series field winding, means for impressing upon said field exciting circuit voltage of supply frequency, a divided interpole winding for said motor, means for permanently connecting a first portion of said interpole winding in series circuit relation with said armature, means for permanently connecting a second portion of said interpole winding in series circuit relation with said series field winding, and a capacitor permanently connected in parallel circuit relation with said second portion of said interpole field winding thereby to cause said first and second portions of said interpole winding to carry in-phase and quadrature interpole currents respectively, whereby said motor may be connected for either motoring or regenerative braking operation while maintaining unchanged the connections of said interpole field winding.

7. In a system of control for a single phase alternating current motor having an armature and a series field winding, switching means for connecting said motor to a source of alternating current supply for motoring and for regenerative braking operation, a divided interpole winding for said motor comprising two portions energized in series circuit relation, means for connecting a first portion of said interpole winding in series circuit relation with said armature, means for connecting a second portion of said interpole winding in series circuit relation with said series field winding and a resistor, and a capacitor connected in parallel circuit relation with said second portion of said interpole winding and said resistor.

8. In a system of control for a single phase alternating current motor having an armature and a series field winding, switching means for connecting said motor to a source of alternating current supply for motoring and for regenerative braking operation, a divided interpole winding for said motor comprising two portions energized in series circuit relation, means for connecting a first portion of said interpole winding in series circuit relation with said armature, means for connecting a second portion of said interpole winding in series circuit relation with said series field winding, and a shunt circuit comprising a capacitor and a resistor in series connected in parallel circuit relation with said second portion of said interpole field winding.

9. In a system of control for a single phase alternating current motor having an armature and a series field winding, a divided interpole winding for said motor, a capacitance connected in parallel circuit relation with one portion of said interpole winding, and means responsive to the speed of said motor for controlling said capacitance.

10. In a system of control for a single phase alternating current motor having an armature and a series field winding, a divided interpole winding for said motor, means for connecting a first portion of said interpole winding in series circuit relation with said armature, means for connecting a second portion of said interpole winding in series circuit relation with said series field winding, a resistance connected in series with said second portion, a capacitive circuit connected in parallel circuit relation with said resistance and said second portion of said interpole winding, and switching means responsive to the speed of said motor arranged simultaneously to control in opposite senses the capacitance of said circuit and said resistance.

11. In a system of control for a single phase alternating current motor having an armature and a series field winding, a divided interpole winding for said motor, means for connecting a first portion of said interpole winding in series circuit relation with said armature, means for connecting a second portion of said interpole winding in series circuit relation with said series field winding, a plurality of capacitors connected in parallel circuit relation with each other and with said second portion of said interpole field winding, and switching means comprising a plurality of contacts sequentially operable in response to the speed of said motor simultaneously to insert resistance in series with said second portion of said interpole winding and to disable said capacitors in a plurality of steps as the speed of said motor increases.

12. In a system of control for a single phase alternating current motor having an armature and a series field winding, switching means for connecting said motor to a source of alternating current supply for motoring and for regenerative braking operation, a divided interpole winding for said motor comprising two portions adapted to be energized in series circuit relation, means for permanently connecting a first portion of said interpole winding in series circuit relation with said armature, means for permanently connecting a second portion of said interpole winding in series circuit relation with said series field winding and with a resistor, a plurality of resistors in series circuit relation with said second portion of said interpole winding and said series field winding, short circuiting means for disabling each of said plurality of resistors, a plurality of capacitors connected in parallel circuit relation with each other and with said second portion of said interpole winding, and speed responsive means comprising a plurality of contacts sequentially operable in response to the speed of said motor simultaneously to disable said short circuiting means and said capacitors in a plurality of steps as the speed of said motor increases.

13. In a system of control for a single phase alternating current motor having an armature and a series field winding, transformer means for energizing said series field winding comprising a primary winding connected in series circuit relation with said armature and a secondary winding connected to energize said series field winding, a divided interpole field winding for said motor comprising a first portion connected in series circuit relation with said armature, and a second portion connected in series circuit relation with said series field winding, switching means for energizing said armature and transformer means from a source of alternating current supply thereby to furnish separate currents to said portions of said interpole winding, and means for maintaining a quadrature relationship between said currents.

14. In a system of control for a single phase alternating current motor having an armature and a series field winding, a field transformer for energizing said series field winding comprising a primary winding connected in series circuit relation with said armature and a secondary winding connected to energize said series field winding, a divided interpole field winding for said motor comprising a first portion permanently connected in series circuit relation with said armature and a second portion permanently connected in series circuit relation with said series field winding, switching means for energizing said armature and said field transformer from a source of alternating current supply, and a capacitor connected in parallel circuit relation with said second portion of said interpole field winding.

15. In a system of control for a single phase alternating current traction motor having an armature and a series field winding, a field transformer for energizing said series field winding comprising a primary winding permanently connected in series circuit relation with said armature and a secondary winding connected to energize said series field winding, a divided interpole winding for said motor comprising a first portion permanently connected in series circuit relation with said armature and a second portion permanently connected in series circuit relation with said series field winding, a resistance permanently connected in series with said second portion of said interpole field winding, a capacitance connected in parallel circuit relation with said second portion of said interpole winding and said resistance, and means responsive to the speed of said armature for controlling said resistance and said capacitance.

16. In a system of control for a single phase alternating current motor having an armature and a series field winding, a transformer for energizing said series field winding comprising a primary winding permanently connected in series circuit relation with said armature and a secondary winding connected to energize said series field winding, a condenser permanently connected in series circuit relation with said series field winding, said condenser having a reactance substantially equal to the inductive reactance of said series field winding, a divided interpole winding for said motor comprising a first portion permanently connected in series circuit relation with said armature and a second portion permanently connected in series circuit relation with said series field winding and with a resistor, a plurality of resistors connected in series circuit relation with said second portion of said interpole winding, short circuiting means for each of said plurality of resistors, a plurality of capacitors connected in parallel circuit relation with each other and with said second portion of said interpole winding and said resistors, and switching means comprising a plurality of contacts sequentially operable in response to the speed of said armature simultaneously to disable said short circuiting means and said capacitors in a plurality of steps as the speed of said armature increases.

17. In a system of control for a single phase alternating current traction motor having an armature and a series field winding, a condenser permanently connected in series with said series field winding, a field transformer for exciting said series field winding comprising a primary winding permanently connected in series with said armature and a secondary winding connected to energize said series field winding and said condenser, a divided interpole winding for said motor comprising a first portion permanently connected in series circuit relation with said armature and a second portion permanently connected in series circuit relation with said series field winding, and with a resistor, a plurality of resistors connected in series circuit relation with said second portion of said interpole winding, short circuiting means for each of said plurality of resistors, a plurality of capacitors connected in parallel circuit relation with each other and with said second portion of said interpole winding and said resistors, speed responsive means comprising a plurality of contacts sequentially operable in response to the speed of said armature simultaneously to disable said short circuiting means and said capacitors in a plurality of steps as the speed of said motor increases, first switching means for connecting said armature and said primary winding of said field transformer across the terminals of a source of alternating current supply thereby to accelerate said motor, second switching means for establishing a regenerative braking circuit for said motor including said armature and a stabilizing resistor, means for establishing a field exciting circuit including said primary winding of said field transformer and said stabilizing resistor, and a field exciting transformer having a secondary winding connected to impress upon said field exciting circuit a voltage of supply frequency and a primary winding connected across the terminals of said source of alternating current supply.

HAROLD S. OGDEN.